United States Patent
Barbieri et al.

[11] Patent Number: 6,122,987
[45] Date of Patent: Sep. 26, 2000

[54] LEVER DEVICE FOR DOUBLE-ACTION REMOTE-CONTROL

[75] Inventors: Walter Barbieri, Trezzo S/Adda; Antonello Alicata, Dalmine; Giovanni Crespi, Trezzo S/Adda, all of Italy

[73] Assignee: Cornelia Brambilla, Trezzo, Italy

[21] Appl. No.: 09/064,168

[22] Filed: Apr. 22, 1998

[30] Foreign Application Priority Data

Apr. 22, 1997 [IT] Italy .................................. MI97A0947

[51] Int. Cl.[7] ..................................................... F16C 1/12
[52] U.S. Cl. .................. 74/500.5; 74/502.6; 74/471 XY; 74/473.34
[58] Field of Search ........................... 74/501.6, 501.5 R, 74/500.5, 502.4, 502.6, 471 XY, 473.34

[56] References Cited

U.S. PATENT DOCUMENTS

| | | | |
|---|---|---|---|
| 4,854,185 | 8/1989 | Lichtenberg et al. | 74/501.5 R |
| 5,235,869 | 8/1993 | Nyezdatny | 74/471 XY |
| 5,265,495 | 11/1993 | Bung et al. | 74/502.6 |

FOREIGN PATENT DOCUMENTS

| | | | |
|---|---|---|---|
| 30817 | 2/1985 | Japan | 74/502.4 |
| 122732 | 5/1989 | Japan | 74/501.6 |

*Primary Examiner*—Mary Ann Battista
*Attorney, Agent, or Firm*—Oblon, Spivak, McClelland, Maier & Neustadt, P.C.

[57] ABSTRACT

Lever device for double-action remote-control, i.e. of rigid tie rods and/or flexible cables, consisting of a lever (12) rotatable in respect of a base element (13), connectable (in 14) to a carrying structure external to an operating machine in which the device (11) is contained into bellows (10) connected-to the base element (13) while the lever (12) is connected to a mobile component (15) from which the elements to fasten the ends of two cables (22) for remote transmission extend and the base element is coupled to two reaction sheaths (21) of the two transmission cables (22), three ball elements (16, 16'), placed at 90° one from the other, extend from the mobile component (15), one of which (16') is inserted into a fixed bush (17) while the other two ball elements (16) are inserted into additional mobile bushes (18) in respect of the base element the bushes (17, 18) being made of plastic material, with good resistance to compression, and placed inside a ring element (23) obtained from a metal band integral with free ends of each one of the transmission cables (22).

9 Claims, 4 Drawing Sheets

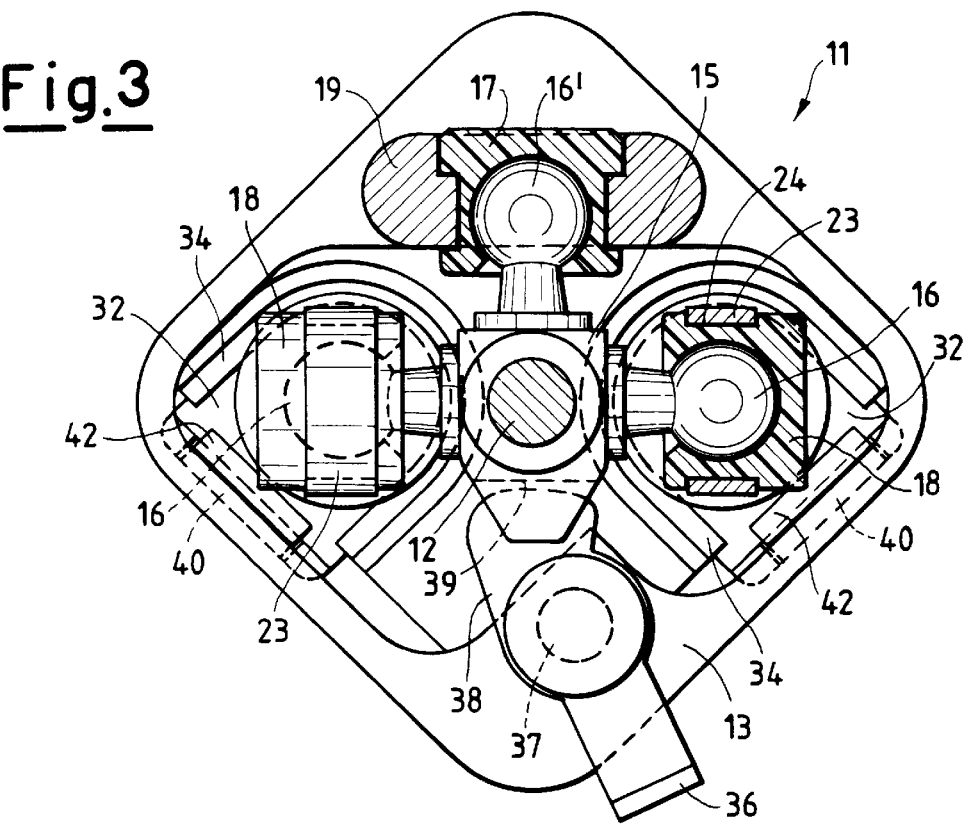
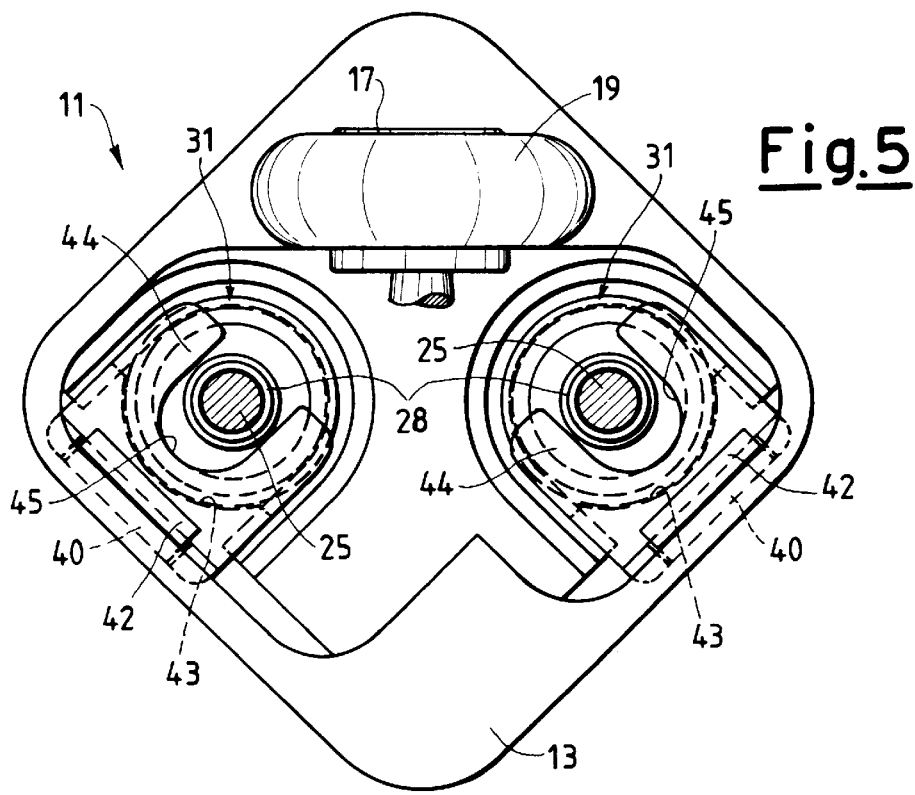

LEVER DEVICE FOR DOUBLE-ACTION REMOTE-CONTROL

BACKGROUND OF THE INVENTION

1. Field of the Invention

The present invention relates to a lever device for double-action remote control, of rigid tie rods and/or flexible cables.

2. Description of the Related Art

At the moment, there are different types of lever devices for operating two rigid tie rods or two flexible cables, generally known as "push-pull". Devices of this type are known and used to control a couple of oleodynamic valves in operating machines or to control the reduction gears known as speed gears.

Said lever devices utilize metal ball joints or systems that transmit the motion by means of small connecting rods that compensate the transverse movements. Both the ball joints and the connecting rods systems are rugged enough but they cannot eliminate the mechanical clearance in the coupling. In fact, special systems for mechanical disposal that can compensate for said clearances are needed.

Besides, it is important not to overlook that this type of control levers cannot eliminate the vibrations of the lever of the same while the operating machine to which they are coupled is working.

An attempt to solve the problem is that of realising a lever with metal ball joints embedded into a matrix of plastic material. According to this known solution, the ball is the final portion of the cable or is connected to the end position of the cable and the matrix, as the ball seat is made of plastic material.

In this case the size of the ball seat must be such as to allow transverse displacement. Besides, the practical embodiment of said seat intended to receive the ball, must be accomplished using rigid plastic material adapted for its destination and its final use.

It follows that also this solution is not the proper one to stand major effort or tearing stress.

Therefore, an object of the present invention is to provide a lever device for remote-control that can solve the technical problems mentioned above.

It is an additional object of the invention to provide a device that presents no clearance but can fully accomplish the function for which it has been intended.

It is an additional object of the invention to provide a device that needs minimum lubrication and adjustment, is extremely easy to be assembled and requires low construction and assembly cost.

BRIEF SUMMARY OF THE INVENTION

These and other objects of the present invention are accomplished by providing a lever device for double-action remote-control, of rigid tie rods and/or flexible cables, consisting of a lever rotatable in respect of a base element, connectable to an external carrying structure of an operating machine in which the device is contained on the upper part into bellows connected to said base element while said lever is connected to a mobile component from which the elements to fasten the ends of two cables for remote-control transmission extend and said base element is coupled to two reaction sheaths of said two transmission cables, characterised in that three ball elements, placed at 90° one from the other, extend from said mobile component, one of which is inserted into a fixed bushing while the other two ball elements are inserted into additional bushings mobile in respect of the base element, at least said bushings being made of plastic material, with good resistance to compression, and placed inside a ring element obtained from a metal band integral with free ends of each one of said transmission cables.

By means of a device according to the present invention, an embodiment can be obtained very easily using also commercial elements.

Besides, such device can be quickly adapted to any type of application.

BRIEF DESCRIPTION OF THE SEVERAL VIEWS OF THE DRAWINGS

The main structural and functional characteristics as well as the advantages of a device according to the invention are clearly shown in the description by way of a non-limiting embodiment, with reference to the drawings appended, in which:

FIG. 3 is a top plan view, sectioned at different levels, of the same position in the elevetional side view of the safety locking position in FIG. 1;

FIG. 5 is a top plan view, sectioned at different levels, showing also the fastening part as in FIG. 4.

DETAILED DESCRIPTION OF THE INVENTION

Figure 1:
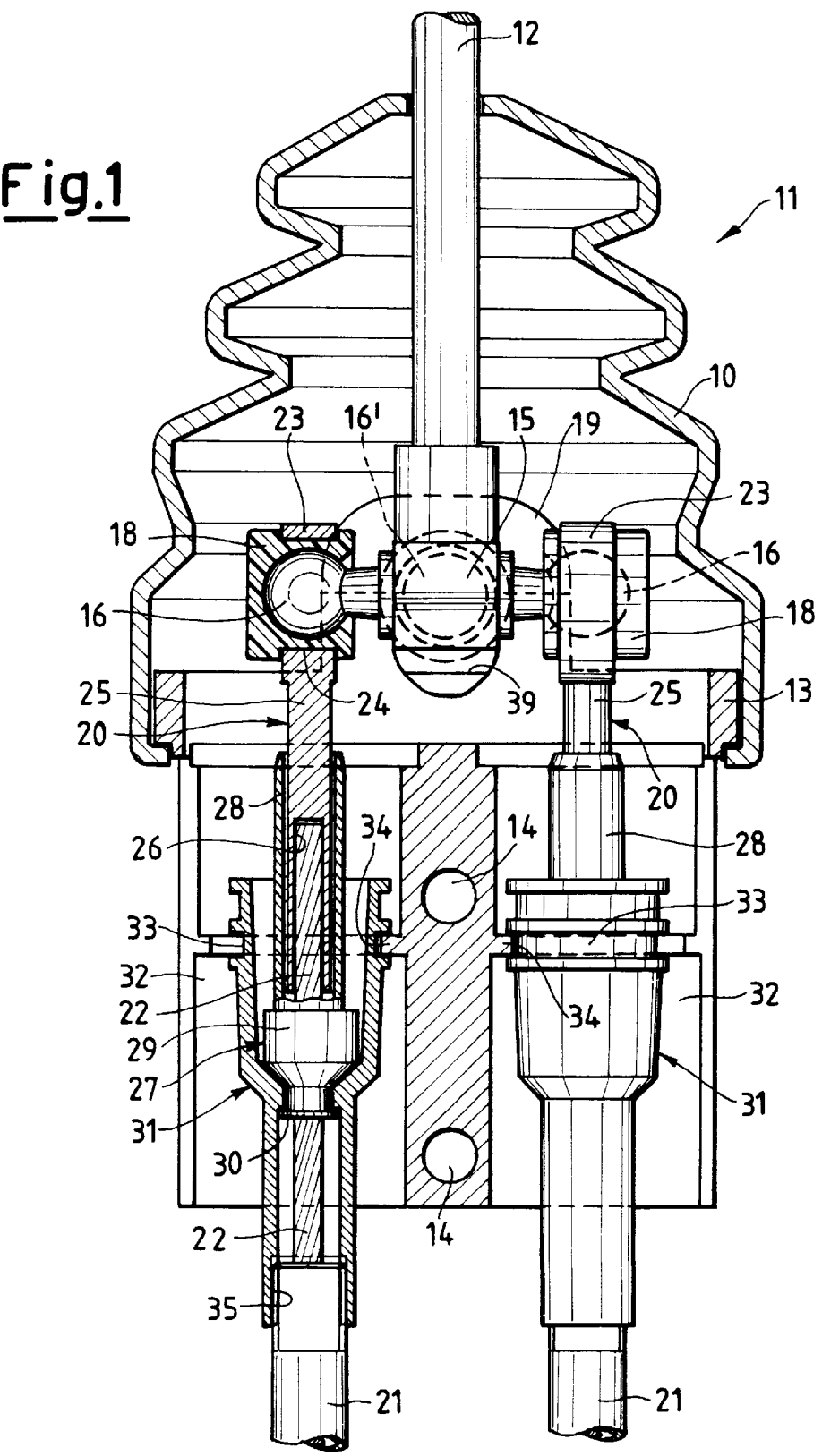
FIG. 1 is a schematic front, partially sectional, elevational view of a lever device for remote-control according to the invention in its safety locking position.
Figure 2:
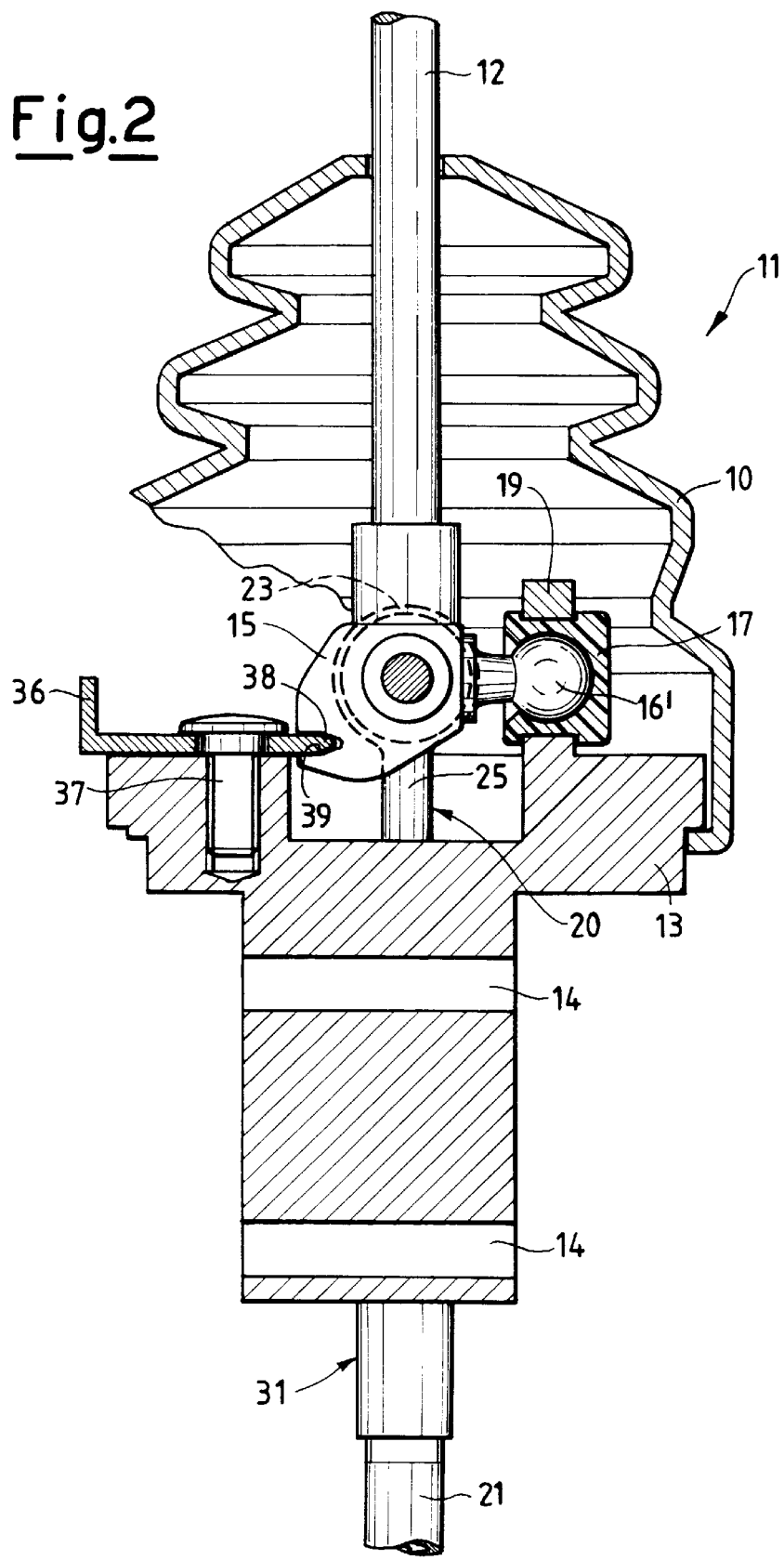
FIG. 2 is a fragmentary section at 90° turn showing the same position as FIG. 1.
Figure 4:
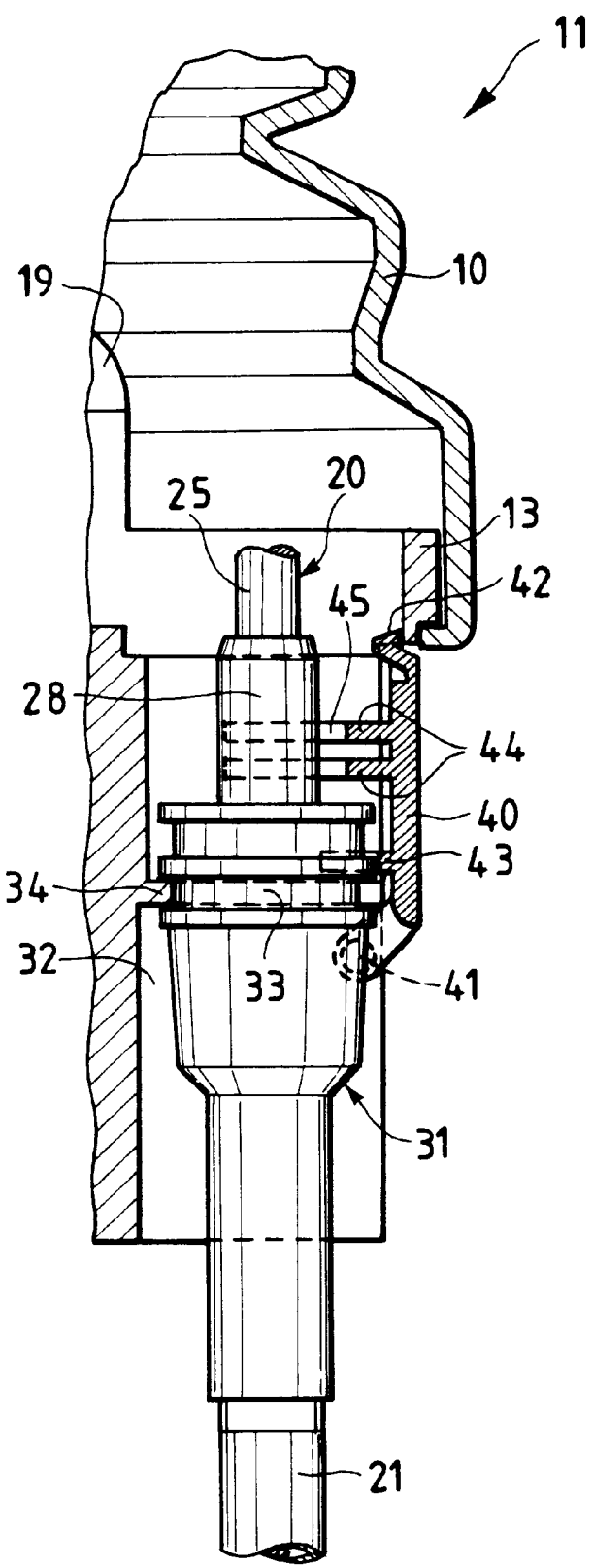
FIG. 4 is a partial elevational section of the only fastening part of the support component inserted into the base element.

With reference to the drawings, a possible practical configuration of a lever device for double-action remote-control, i.e. of rigid tie rods and/or flexible cables, according to the invention and overall indicated by 11, is shown.

Said device 11 consists of a lever 12 rotatable in respect of a base element 13, such as a plate, which can be connected, through holes 14 made in its lower part, to an external carrying structure serving as an operating machine, not shown. The device 11 is contained on the upper part into bellows 10 connected to the base element 13 preventing any accidental access and ensuring proper protection from atmospheric agents.

The lever 12 is rotated because the lever itself is connected to a mobile component 15 from which the elements to fasten the ends of two cables 22 for remote-control transmission extend. In particular, three ball elements 16 and 16', i.e. steel elements, placed at 90° one from the other extend from the mobile component 15.

One of said three ball elements, 16', is inserted into a fixed bushing 17 while the remaining two ball elements 16 are inserted into additional mobile bushings 18 in respect of the base element 13.

The first bushing 17 is in fact rigidly connected to a support 19 fixed against the base element 13. Each one of the two other bushings 18 is connected to a support 20 which can move in respect of the same base element 13. Said base element 13, serving as box, has also the function of making out the reaction for two sheaths 21 of two cables 22 for remote-control transmission of the intended signal. The support 20 includes both a ring element 23 housed into a ring hollow 24 obtained in the bushing 18 and an extension 25 receiving in its hollow part 26 the end of a cable 22 fixed and blocked by means of folded seam.

Besides both the extension 25 and the cable 22 inside it are inserted into a joint element 27 including two articulated elements 28 and 29 connected by a ball connection. The joint element 27 is inserted into a support element 31 and is blocked inside it by means of an enlargement of its end 30.

The support element 31 can be inserted and fixed inside a hollow extension 32 of the base element 13 and is inserted through an external ring hollow 33 on a tooth of complementary shape 34 obtained inside the hollow extension 32.

The sheath 21 is screwed on one threaded end 35 of the support element 31 and is blocked there for its function of reaction.

The base element 13 is provided also of a small locking lever 36 which can swing around a pivot 37 fixed on the base element 13, parallel to the plane of the same base element. Said locking lever 36 is engaged, through a tooth end 38, on a seat 39 of the mobile element 15 by blocking of the movement of the lever 12. This is to avoid the possibility of accidental setting in one of its possible positions and the consequent creation of a situation that can be dangerous for people who are near the operating machine.

There are also two cover components 40, coupled with the base element 13 at the two hollow extensions 32 which point downwards. Thanks to their pivot extensions 41, obtained in the side part of one of their lower ends, said two cover components 40, can be made integral with the base element 13 and can rotate between an engagement position and a disengagement position in respect of the hollow extensions 32. Besides, the cover elements 40 are snapped to one upper part of the base element 13 by means of teeth 42.

In their intermediate part pointing toward the inside of the hollow extensions 32, the cover elements 40 present a first fork portion 43 which is engaged on the support element 31 and blocks it between the hollow extensions 32. A second fork portion 44, provided with a larger central hollow 45, clasps and guides the joint element 27 at its upper joint element 28.

In this way, the second fork portion 44 serves as an element that couples and guides the support 20 allowing the support or the fixing element to move in respect of the base element 13 with a straight movement only, basically directed towards the ball element 16' placed inside the fixed bushings 17. The support 20 can thus move in respect of the same base element 13 with a straight movement only and at an angle of 45° in respect of the central ball element 16'. Besides, this is the only possible movement and relates to the two ball elements 16 through which the two different cables 22 can be separately operated.

It must be noticed that the efficiency would be significantly reduced if the cable 22 makes movements that are not coherent with the function of the mechanism.

The lever device for double-action remote-control according to the invention allows both simultaneous and discrete control of two movements through a single control lever. This particular type of control is not working through properly defined mechanical axes, but through three ball pivot engagements, one of them being fixed while the two others being mobile and connected to respective cables. In the operational phases when the control is simultaneous on both cables the movement of the lever takes place around the fixed point, while in the cases in which only one of the cables is controlled an axis of rotation is created every time. The axis of rotation passes through said fixed point and the end of the cable which is not controlled stopped because the support 20 is forced not to move by the engagement consisting of the central hollow 45 in the second fork portion 44.

According to the present invention special plastic bushings 17 and 18 resistant to compression will be used. Besides, the positioning of the two bushings 18 inside a ring element 23 obtained from a steel band is responsible for extremely high mechanical resistance. In this way the flexibility of the plastic material is combined with the mechanical characteristics of the steel thus obtaining a resistant coupling with good maneuver angles, characteristics of reduced friction and lack of clearance. As a consequence, there are practically no risk of seizure even with elements coupled with a certain tolerance margin and low need for lubrication.

The assembly of the invention also allows optimum working of the device. The positioning of the bushings inside a seat, the shape of which is generally circular but can also be polyhedral or similar, serves as optimum containment. This assembly limits the possibility of elastic deformation and since its working is radial, prevents the ball element from withdrawing from the bushing under the working conditions of the specific project. The result is a highly functional coupling at low cost.

It is therefore evident the simple way in which the present invention provides a solution to the problem of achieving the optimum structure and working for a lever device for remote-control as before described.

The Italian priority application No. MI97A 000947 is herein incorporated by reference.

We claim:

1. A lever device for double-action remote-control of flexible cables, comprising:

a base element;

a lever connected to and rotatable with respect to said base element;

a mobile component connected to said lever;

a pair of cables coupled to said mobile component;

fastening elements coupling said cables to said mobile component;

a pair of reaction sheaths coupled to said respective cables;

three ball elements placed at 90° from one another and extending from said mobile component;

a fixed bushing into which a first of said ball elements is inserted, whereby both horizontal and vertical movement of said first of said ball elements are prevented;

two mobile bushings made of compression resistant plastic material and into which a second and a third of said ball elements are inserted; and said fastening elements comprising ring elements inside of which said mobile bushings are positioned.

2. A lever device as recited in claim 1, wherein said fixed bushing is made of plastic material, and further comprising a fixed support coupled to said base element and maintaining said fixed bushing in position.

3. A lever device as recited in claim 2, wherein said ring elements and said fixed support are made of steel.

4. A lever device as recited in claim 1, wherein:

each mobile bushing comprises a ring hollow in which a respective of said ring elements are positioned; and said fastening elements comprise an extension with a hollow portion to receive respective of said cables.

5. A lever device as recited in claim 4, comprising:
- a joint element in which said fastening elements are inserted and which includes two articulated elements connected to each other; and
- a support element in which said joint element is inserted and blocked by enlargement of the end of said joint element, said support element fixed and blocked inside said base element.

6. A lever device as recited in claim 5, wherein said base element comprises a hollow extension in which said support element is fixed and inserted through an external ring hollow on a tooth of complementary shape inside said hollow extension.

7. A lever device as recited in claim 1, comprising:
- guide elements inside of which said fastening elements are placed, said guide elements allowing said fastening elements to move with respect to said base element in a straight movement only directed towards said first ball element within said fixed bushing.

8. A lever device as recited in claim 7, wherein said guide elements are placed on cover elements and snapped to said base element by teeth.

9. A lever device as recited in claim 7, wherein said guide elements comprise a fork portion with a central hollow that clasps and guides said fastening elements.

* * * * *